(12) United States Patent
Pan et al.

(10) Patent No.: US 10,983,048 B2
(45) Date of Patent: Apr. 20, 2021

(54) TERAHERTZ FULL-POLARIZATION-STATE DETECTION SPECTROGRAPH

(71) Applicants: Shenzhen Institute of Terahertz Technology and Innovation, Guangdong (CN); Shenzhen Terahertz System Equipment Co., Ltd., Guangdong (CN)

(72) Inventors: Yi Pan, Shenzhen (CN); Shichang Peng, Shenzhen (CN); Qing Ding, Guangdong (CN)

(73) Assignees: Shenzhen Terahertz System Equipment Co., Ltd., Shenzhen (CN); Shenzhen Institute of Terahertz Technology and Innovation, Shenzhen (CN)

( * ) Notice: Subject to any disclaimer, the term of this patent is extended or adjusted under 35 U.S.C. 154(b) by 157 days.

(21) Appl. No.: 16/336,766

(22) PCT Filed: Sep. 13, 2017

(86) PCT No.: PCT/CN2017/101494
§ 371 (c)(1),
(2) Date: Mar. 26, 2019

(87) PCT Pub. No.: WO2018/059233
PCT Pub. Date: Apr. 5, 2018

(65) Prior Publication Data
US 2020/0284722 A1    Sep. 10, 2020

(30) Foreign Application Priority Data

Sep. 27, 2016 (CN) .......................... 201610856759.9

(51) Int. Cl.
*G01N 21/21* (2006.01)
*G01N 21/3581* (2014.01)

(52) U.S. Cl.
CPC ......... *G01N 21/3581* (2013.01); *G01N 21/21* (2013.01); *G01N 2201/0636* (2013.01);
(Continued)

(58) Field of Classification Search
CPC ............... G01N 21/3581; G01N 21/21; G01N 2201/06113; G01N 2201/0636; G01N 2201/0683
(Continued)

(56) References Cited

U.S. PATENT DOCUMENTS 5,880,877 A * 3/1999 Fermann ............. H01S 3/06754
359/341.31
8,564,777 B1 * 10/2013 Herzinger ............. G01N 21/211
356/369
(Continued)

FOREIGN PATENT DOCUMENTS

CN 103323420 A 9/2013
CN 203981375 U 12/2014
(Continued)

OTHER PUBLICATIONS

Author: Wojdyla et al., Title: Brewster's angle silicon wafer terahertz linear polarizer, Date: 2011, Publisher: Optics Express (Year: 2011).*
(Continued)

*Primary Examiner* — Mark R Gaworecki
(74) *Attorney, Agent, or Firm* — Young Basile Hanlon & MacFarlane, P.C.

(57) ABSTRACT

A terahertz full-polarization-state detection spectrograph is provided, which comprises a terahertz wave generator, a polarizer, a polarizing beam-splitting sheet, a horizontal terahertz detector, and a vertical terahertz detector. The terahertz wave generator produces a terahertz wave, and the purity of the terahertz wave is optimized by the polarizer; a detected sample modulates the terahertz wave, the purity of
(Continued)

which is optimized, to obtain a terahertz modulated wave; the polarizing beam-splitting sheet decomposes the terahertz modulated wave into a horizontal terahertz wave and a vertical terahertz wave which are vertical to each other in a polarization state; the two corresponding terahertz detectors are used for detecting the two terahertz waves respectively, and then the characteristics of the detected sample are analyzed according to the detection result.

16 Claims, 2 Drawing Sheets

(52) U.S. Cl.
CPC ............. $G01N\ 2201/0638$ (2013.01); $G01N\ 2201/0683$ (2013.01); $G01N\ 2201/06113$ (2013.01)

(58) Field of Classification Search
USPC .................................................. 250/339.07
See application file for complete search history.

(56) References Cited

U.S. PATENT DOCUMENTS

| | | | | |
|---|---|---|---|---|
| 10,006,859 | B2* | 6/2018 | Ashrafi | G01N 21/6486 |
| 2002/0118371 | A1* | 8/2002 | Jiang | G01N 21/3563 |
| | | | | 356/517 |
| 2003/0016358 | A1* | 1/2003 | Nagashima | G01N 21/3581 |
| | | | | 356/364 |
| 2003/0081210 | A1* | 5/2003 | Masaki | G01N 23/20 |
| | | | | 356/369 |
| 2004/0196660 | A1* | 10/2004 | Usami | G01N 21/3581 |
| | | | | 362/458 |
| 2005/0230625 | A1* | 10/2005 | Zhang | G01N 21/3581 |
| | | | | 250/341.1 |
| 2006/0231762 | A1* | 10/2006 | Ohtake | G01N 21/3581 |
| | | | | 250/341.8 |
| 2006/0255277 | A1* | 11/2006 | Cole | G01N 21/3563 |
| | | | | 250/341.1 |
| 2008/0014580 | A1* | 1/2008 | Alfano | G01N 21/3586 |
| | | | | 435/6.19 |
| 2009/0261919 | A1* | 10/2009 | Takeda | H01P 1/32 |
| | | | | 333/1.1 |
| 2010/0187420 | A1* | 7/2010 | Itsuji | G01J 3/42 |
| | | | | 250/340 |
| 2011/0220799 | A1* | 9/2011 | Kim | H01Q 15/0086 |
| | | | | 250/338.1 |
| 2012/0206724 | A1* | 8/2012 | Herzinger | G01N 21/3581 |
| | | | | 356/367 |
| 2012/0261580 | A1* | 10/2012 | Herzinger | G01J 4/04 |
| | | | | 250/353 |
| 2014/0183363 | A1* | 7/2014 | Kajiki | G01J 9/00 |
| | | | | 250/339.07 |
| 2014/0264032 | A1* | 9/2014 | Neshat | G01N 21/3586 |
| | | | | 250/339.08 |
| 2014/0284484 | A1* | 9/2014 | Herzinger | G01J 4/04 |
| | | | | 250/341.1 |
| 2015/0076354 | A1* | 3/2015 | Koizumi | G01N 33/48 |
| | | | | 250/341.8 |
| 2015/0136986 | A1* | 5/2015 | Akiyama | G01N 21/3586 |
| | | | | 250/339.06 |
| 2015/0136987 | A1* | 5/2015 | Kajiki | G02F 1/353 |
| | | | | 250/339.07 |
| 2015/0316832 | A1* | 11/2015 | Sato | G01J 3/10 |
| | | | | 250/338.1 |
| 2016/0116400 | A1* | 4/2016 | Hunt | G01N 21/39 |
| | | | | 250/341.1 |
| 2016/0131527 | A1* | 5/2016 | Baik | G01J 3/108 |
| | | | | 356/326 |
| 2016/0169748 | A1* | 6/2016 | Zheng | G02F 1/37 |
| | | | | 250/341.3 |
| 2017/0370833 | A1* | 12/2017 | Markelz | G01N 21/03 |

FOREIGN PATENT DOCUMENTS

| | | |
|---|---|---|
| CN | 104390935 A | 3/2015 |
| CN | 106248616 A | 12/2016 |
| CN | 206095932 U | 4/2017 |

OTHER PUBLICATIONS

Author: Mao et al., Title: A Terahertz Polarizer Based on Multilayer Metal Grating Filled in Polyimide Film, Date: Feb. 2016, Publisher: IEEE (Year: 2016).*

* cited by examiner

TERAHERTZ FULL-POLARIZATION-STATE DETECTION SPECTROGRAPH

CROSS-REFERENCE TO RELATED APPLICATION(S)

This application is a 371 application of International Application No. PCT/CN2017/101494, filed on Sep. 13, 2017, which claims priority to Chinese Patent Application No. 201610856759.9, filed on Sep. 27, 2016, the contents of both of which are herein incorporated by reference in their entireties.

TECHNICAL FIELD

The present invention relates to the field of terahertz wave detection, and more particularly, to a terahertz full-polarization-state detection spectrograph.

BACKGROUND

The terahertz full-polarization-state detection can be applied to many fields of research, such as the detection of terahertz optics, including terahertz prisms, wave plates, and photoconductive antennas which are sensitive to a polarization state. It can also be applied to the biological field, such as the detection of biomolecules with chiral characteristics such as amino acids and proteins. The molecules with chiral characteristics have different absorptions of terahertz's left-handed or right-handed circularly polarized light. This phenomenon is also called circular dichroism. A wide range of applications make the research on the terahertz full-polarization-state detection spectrograph of a great value.

In order to measure multiple polarization states introduced by circular dichroism or optically active devices, a terahertz full-polarization-state detection spectrograph must be capable of measuring the amplitude and phase of the terahertz wave quadrature field component. This measurement can use an electro-optical crystal or a conventional photoconductive antenna receiver, but the electro-optical crystal or a photoconductive antenna must be rotated to independently detect each polarization state. This mechanical adjustment not only takes a long measurement time, but also causes a great measurement error.

SUMMARY

Based on the above situation, it is necessary to provide a terahertz full-polarization-state detection spectrograph which can quickly detect full-polarization-state terahertz waves accurately, thereby improving the detection precision and detection efficiency of the detected sample.

A terahertz full-polarization-state detection spectrograph, comprising:

a terahertz wave generator, used for producing a terahertz wave of a linear polarization state using a laser;

a polarizer located at a radiation end of the terahertz generator, used for receiving the terahertz wave radiation and filtering out the stray light in the terahertz wave to convert the terahertz wave into a linearly polarized light with a higher polarization-state purity; the linearly polarized light outputted by the polarizer is used for illuminating a detected sample to produce a terahertz modulated wave;

a polarizing beam-splitting sheet located in the transmission path of the terahertz modulated wave, used for decomposing the terahertz modulated wave into a horizontal terahertz wave and a vertical terahertz wave which are vertical to each other in a polarization state;

a horizontal terahertz detector located in the transmission path of the horizontal terahertz wave, used for detecting the horizontal terahertz wave;

a vertical terahertz detector located in the transmission path of the vertical terahertz wave, used for detecting the vertical terahertz wave.

In one embodiment, the polarizer comprises two multi-layer silicon wafers of the same structure, which are inclined in a V-shape; the angle between each of the multi-layer silicon wafers and the light beam formed by the terahertz wave is a Brewster angle.

In one embodiment, the multi-layer silicon wafers have four layers.

In one embodiment, the terahertz wave generator is a gallium arsenide photoconductive antenna.

In one embodiment, the polarizing beam splitting sheet is a metal wire grid beam-splitting sheet.

In one embodiment, the invention further comprises a first off-axis parabolic mirror used for focusing a linearly polarized light produced by the polarizer onto the detected sample and a second off-axis parabolic mirror used for collimating the terahertz modulated wave and sending it to the polarizing beam-splitting sheet.

In one embodiment, a laser source is also comprised, used for producing a laser.

In one embodiment, the invention further comprises a beam-splitting sheet provided on the laser beam path, wherein the beam-splitting sheet comprises a first beam-splitting sheet used for splitting the laser into a first light beam and a second light beam, and a second beam-splitting sheet; the first light beam is used for pumping the terahertz wave generator to produce the terahertz wave, and the second light beam is split into a third light beam and a fourth light beam by the second beam-splitting sheet; the third light beam is used for exciting the horizontal terahertz detector to detect the horizontal terahertz wave, and the fourth light beam is used to excite the vertical terahertz detector to detect the vertical terahertz wave.

In one embodiment, the invention further comprises a first delay line, a second delay line, and a third delay line, wherein the first delay line performs a delaying process on the first light beam and sends the first light beam to the terahertz wave generator, the second delay line performs a delaying process on the third light beam and sends the third light beam to the horizontal terahertz detector, and the third delay line performs a delaying process on the fourth light beam and sends the fourth light beam to the vertical terahertz detector, so that the lasers processed by the beam-splitting sheet reach the terahertz wave generator, the horizontal terahertz detector and the vertical terahertz detector at the same time.

In one embodiment, the invention further comprises three sets of lenses and focusing lenses, respectively a first lens and a first focusing lens, a second lens and a second focusing lens, a third lens and a third focusing lens; the terahertz wave generator, the horizontal terahertz detector, and the vertical terahertz detector are respectively connected between a set of lens and focusing lens, wherein the first lens performs a focusing process on the first light beam and sends the first light beam to the terahertz wave generator, the first focusing lens collimates a terahertz wave generated by the terahertz wave generator and sends the terahertz wave to the polarizer, and the second lens performs a focusing process on the third light beam and sends the third light beam to the horizontal terahertz detector, the second focusing lens performs a focusing process on the horizontal terahertz wave and sends the horizontal terahertz wave to the horizontal terahertz detector, the third lens performs a focusing process on the fourth light beam and sends the fourth light beam to the vertical terahertz detector, and the third focusing lens performs a focusing process on the vertical terahertz wave and sends the vertical terahertz wave to the vertical terahertz detector.

The above terahertz full-polarization-state detection spectrograph comprises a terahertz wave generator, a polarizer, a polarizing beam-splitting sheet, a horizontal terahertz detector, and a vertical terahertz detector. The terahertz wave generator produces a terahertz wave, and the purity of the terahertz wave is optimized by the polarizer; a detected sample modulates the terahertz wave, the purity of which is optimized, to obtain a terahertz modulated wave; the polarizing beam-splitting sheet decomposes the terahertz modulated wave into a horizontal terahertz wave and a vertical terahertz wave which are vertical to each other in a polarization state; two corresponding terahertz detectors are used for detecting the two terahertz waves respectively, and then the characteristics of the detected sample are analyzed according to the detection result. The terahertz full-polarization-state detection spectrograph can quickly detect full-polarization-state terahertz waves accurately, thereby improving the detection precision and detection efficiency of the detected sample.

BRIEF DESCRIPTION OF DRAWINGS

The drawings used in describing the embodiments are briefed hereinafter to better understand the technical solution of the embodiments of the present invention. It is apparent that the drawings in the following description only serve as some embodiments of the present invention. Those skilled in the art may make other drawings based on these drawings without contributing creative labor.

DETAILED DESCRIPTION

In order to give a clearer description of the objectives, technical solutions and advantages of the present invention, the invention is further detailed in combination with the drawings and embodiments as follows. It shall be understood that the specific embodiments described herein are only to illustrate rather than to limit the present invention.

Unless otherwise defined, all technical and scientific terms used herein have the same meaning. The terms used in the description of the present invention are only for the purpose of describing the specific embodiments and are not intended to limit the invention. The term "and/or" as used herein includes any and all combinations of one or more of the associated listed items.

Figure 1:
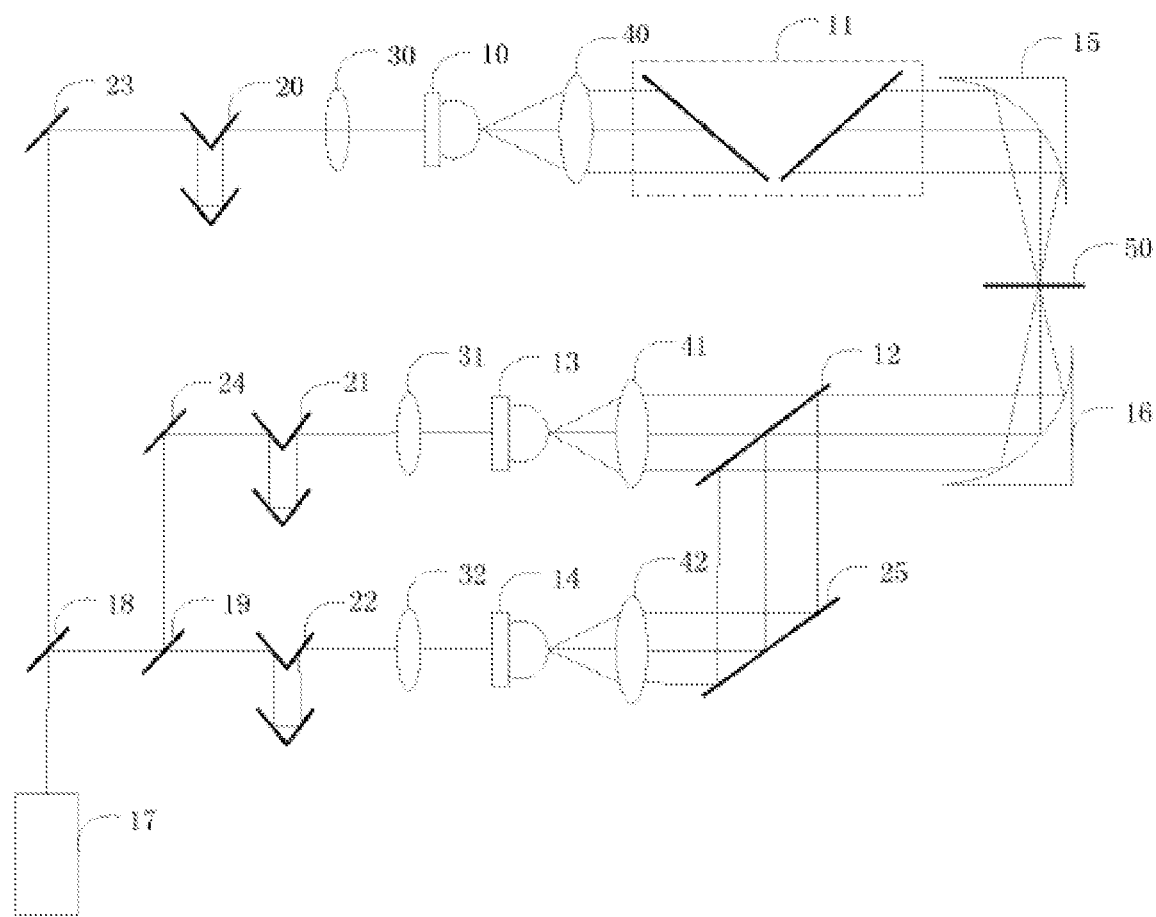
FIG. 1 is a structural diagram of the terahertz full-polarization-state detection spectrograph in an embodiment.

Referring to FIG. 1, FIG. 1 is a structural diagram of the terahertz full-polarization-state detection spectrograph in an embodiment.

In this embodiment, the terahertz full-polarization-state detection spectrograph comprises a terahertz wave generator 10, a polarizer 11, a polarizing beam-splitting sheet 12, a horizontal terahertz detector 13, and a vertical terahertz detector 14.

The terahertz wave generator 10 is used for producing a terahertz wave of a linear polarization state using a laser. The terahertz wave generator 10 is a gallium arsenide photoconductive antenna; the gallium arsenide photoconductive antenna, which is a coplanar antenna, produces a terahertz radiation under the action of laser pumping, that is, it emits a terahertz wave, and the terahertz wave is a linearly polarized light.

The polarizer 11 located at a radiation end of the terahertz generator 10 is used for filtering out the stray light in the terahertz wave to convert the terahertz wave into a linearly polarized light with a higher polarization-state purity; the linearly polarized light outputted by the polarizer 11 is used for illuminating a detected sample 50 to produce a terahertz modulated wave. The terahertz wave produced by the terahertz wave generator 10 is mainly a linearly polarized light, and a small amount of stray light having a polarization state different from that of the linearly polarized light exists, so it is necessary to filter out the stray light to obtain a linear polarized light of a higher purity and improve the precision of sample detection. The polarizer 11 allows the required linearly polarized light to pass while reflecting any unwanted stray light so that the stray light does not enter the subsequent detection system.

In one embodiment, the polarizer 11 comprises two multi-layer silicon wafers of the same structure, which are inclined in a V-shape; each layer of the silicon wafers has a high resistivity, and a single layer of the silicon wafer is of a rectangular shape and can be 100 mm long and 30 mm wide and 0.5 mm thick; the multi-layer silicon wafers can have four layers. The angle between each of the multi-layer silicon wafers and the light beam formed by the terahertz wave is a Brewster angle. After the stray light is reflected by the polarizer 11, the reflected light is converted into a linearly polarized light, with the propagation direction of the linearly polarized light being perpendicular to the linearly polarized light transmitted in the horizontal direction, and is reflected by the polarizer 11 without entering into the subsequent detection system, so that the linearly polarized light required, that is, the linearly polarized terahertz wave propagating in the horizontal direction, can pass smoothly. The extinction ratio of the polarizer 11 can reach $10^4$, and the linearly polarized light with a higher purity of the polarization state can be obtained, with a good extinction effect.

The polarizing beam-splitting sheet 12 located in the transmission path of the terahertz modulated wave is used for decomposing the terahertz modulated wave into a horizontal terahertz wave and a vertical terahertz wave which are vertical to each other in a polarization state.

Figure 2:
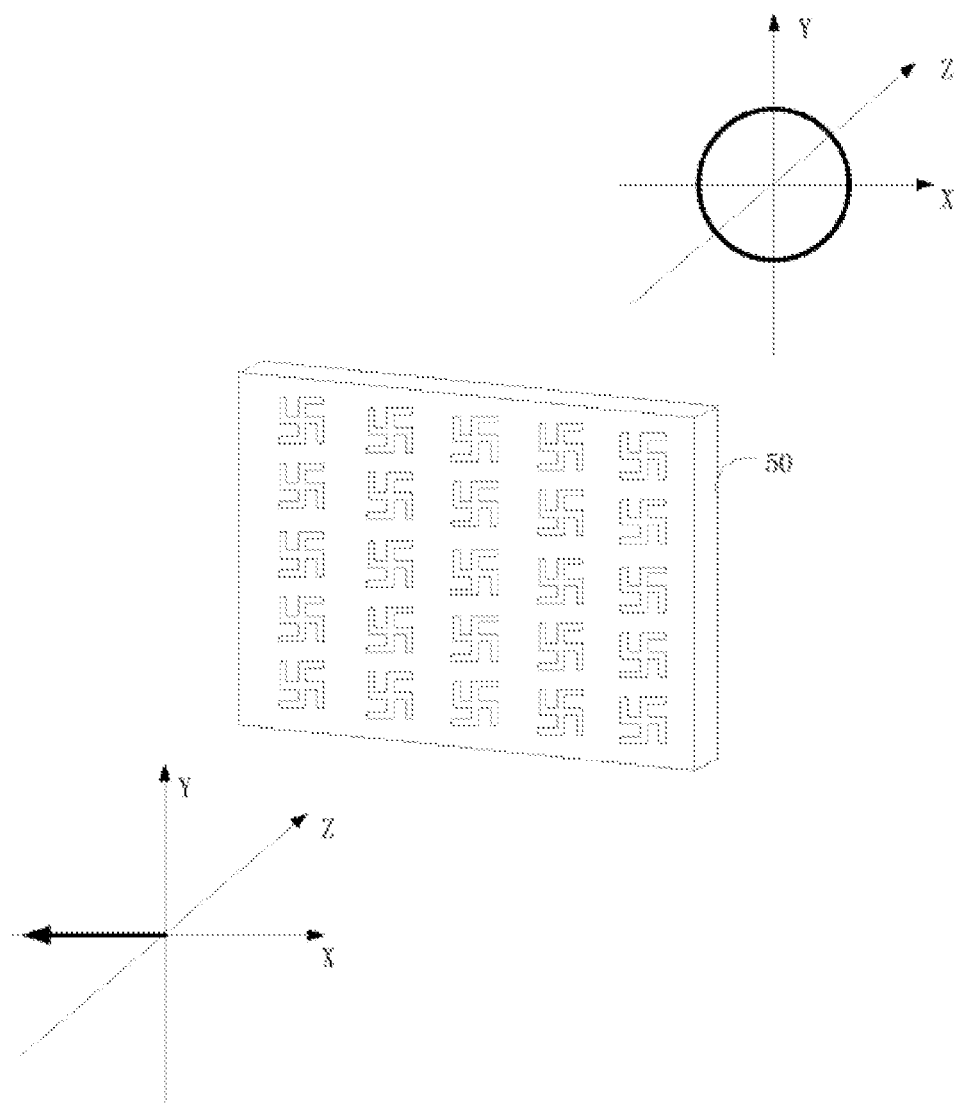
FIG. 2 is a schematic diagram of the modulation of a terahertz wave by a detected sample in an embodiment.

Referring to FIG. 2, FIG. 2 is a schematic diagram of the modulation of a terahertz wave by a detected sample 50 in an embodiment. The detected sample 50 is of a metamaterial structure, with the surface having a single layer of metal structure of a periodic structure which is optically active. The three-dimensional coordinate system is a three-dimensional coordinate system before and after the terahertz wave is modulated by the measured sample 50, wherein a black arrow indicates a light vector before the terahertz wave is modulated, and a circle indicates a trajectory formed by the light vector after the terahertz wave is modulated. It is obvious that after modulation by the sample 50, the linear-polarization-state terahertz wave is converted into a circular-polarization-state terahertz wave, that is, a circularly polarized light.

In an actual detection, the detected sample 50 may be other substances, and the linear-polarization-state terahertz wave may be modulated to have other full polarization states, such as a linear polarization state or an elliptical polarization state.

The polarizing beam-splitting sheet 12 is a metal wire grid beam-splitting sheet composed of equidistantly arranged parallel tungsten wires having a pitch of 5 μm. During operation, the polarizing beam-splitting sheet 12 is powered, and the incident electromagnetic wave polarized in the direction of the metal grid is represented as a typical metal plate, and most of the wave will be reflected back; if the polarization direction of the incident electromagnetic wave is perpendicular to the metal wire grid, the electromagnetic wave can smoothly pass through the polarizing beam-splitting sheet 12.

The circularly polarized light modulated by the detected sample 50 is projected on the metal wire grid beam-splitting sheet; the terahertz wave component, the polarization direction of which is parallel to the metal wire grid in the circularly polarized light, is reflected out, and the terahertz wave component, the polarization direction of which is perpendicular to the metal wire grid, smoothly passes through the metal wire grid beam-splitting sheet. The circularly polarized light is decomposed into two beams, namely a horizontal terahertz wave and a vertical terahertz wave respectively, perpendicular to each other in the polarization direction through the metal wire grid beam-splitting sheet.

The horizontal terahertz detector 13 located in the transmission path of the horizontal terahertz wave is used for detecting the horizontal terahertz wave.

The vertical terahertz detector 14 located in the transmission path of the vertical terahertz wave is used for detecting the vertical terahertz wave.

Both the horizontal terahertz wave and the vertical terahertz wave are linearly polarized lights, and two terahertz detectors are respectively set to detect the two linearly polarized lights, to obtain the amplitude and phase of the circularly polarized light quadrature field component, so that the characteristics of the circularly polarized light is analyzed to acquire the characteristics of the measured sample.

The scheme is also applicable to the detection of a linearly polarized light and an elliptically polarized light, and both the linearly polarized light and the elliptically polarized light can be decomposed into quadrature field components for detection. Both terahertz detectors use a dipole probe antenna to receive only a terahertz wave with a polarization state parallel to the dipole axis. If the polarization direction of the horizontal terahertz wave obtained after being processed by the polarizing beam-splitting sheet 12 is parallel to the dipole axis of the horizontal terahertz detector, the horizontal terahertz detector 13 receives only the horizontal terahertz wave, and does not need to use terahertz polarizer to process the horizontal terahertz wave, with a high detection precision and a simple structure.

The terahertz detector 10 can determine whether or not the received terahertz wave is a linear polarization state or other polarization states according to different light intensities, and then analyzes the terahertz modulated wave to obtain the amplitude and phase of the polarization-state quadrature field component, so that the full-polarization-state terahertz modulated wave can be detected, and then the characteristics of the detected sample 50 are analyzed according to the detected result.

In one embodiment, the terahertz full-polarization-state detection spectrograph further comprises a first off-axis parabolic mirror 15 used for focusing the linearly polarized light produced by the polarizer 11 onto the detected sample 50, and a second off-axis parabolic mirror 16 used for collimating the terahertz modulated wave and sending it to the polarizing beam-splitting sheet 12. The terahertz wave emitted from the polarizer 11, which is a high-purity linearly polarized light propagating in the horizontal direction, is subjected to a focusing process by the first off-axis parabolic mirror 15, and is projected onto the detected sample 50 to detect the detected sample 50; the terahertz modulated wave modulated by the sample 50 is in a diverged state and is collimated by the second off-axis parabolic mirror 16 to be converted into a horizontally transmitted terahertz modulated wave and sent to the polarizing beam-splitting sheet 12.

In one embodiment, the terahertz full-polarization-state detection spectrograph further comprises a laser source 17 used as a light source of the terahertz full-polarization-state detection spectrograph for providing a laser producing terahertz wave and exciting the working laser of the horizontal terahertz detector 13 and the vertical terahertz detector 14. The laser source 17 is a femtosecond laser, which is a sapphire laser; the central wavelength of the emitted laser is 800 nm, and a laser pulse having a pulse width of 100 fs is produced, with a power of 100 mw.

In one embodiment, the terahertz full-polarization-state detection spectrograph further comprises a beam-splitting sheet provided on the laser beam path, wherein the beam-splitting sheet comprises a first beam-splitting sheet 18 used for splitting the laser into a first light beam and a second light beam, and a second beam-splitting sheet 19; the first light beam is used for pumping the terahertz wave generator 10 to produce the terahertz wave, and the second light beam is split into a third light beam and a fourth light beam by the second beam-splitting sheet 19; the third light beam is used for exciting the horizontal terahertz detector 13 to detect the horizontal terahertz wave, and the fourth light beam is used to excite the vertical terahertz detector 14 to detect the vertical terahertz wave.

The laser produced by the laser source 17 is divided into three beams, wherein one beam is used for pumping the terahertz wave generator 10 to perform a terahertz radiation to produce a linearly polarized terahertz wave, and the other beam is divided into two for exciting two terahertz detectors to detect the terahertz modulated wave quadrature field component respectively.

Specifically, the laser used for pumping the terahertz wave generator 10 to perform a terahertz radiation is sent to the terahertz wave generator 10, after the propagation direction is changed by the first mirror 23. The laser used for exciting the horizontal terahertz detector 13 is sent to the horizontal terahertz detector 13, after the propagation direction is changed by the second mirror 24. So that three laser beams are all in the horizontal direction and do not interfere with each other.

In one embodiment, the terahertz full-polarization-state detection spectrograph further comprises a first delay line 20, a second delay line 21, and a third delay line 22, wherein the first delay line 20 performs a delaying process on the first light beam and sends the first light beam to the terahertz wave generator 10, the second delay line 21 performs a delaying process on the third light beam and sends the third light beam to the horizontal terahertz detector 13, and the third delay line 22 performs a delaying process on the fourth light beam and sends the fourth light beam to the vertical terahertz detector 14, so that the lasers processed by the beam-splitting sheet reach the terahertz wave generator 10, the horizontal terahertz detector 13 and the vertical terahertz detector 14 at the same time.

When the detected sample 50 is detected, it is necessary to simultaneously detect the terahertz modulated wave quadrature field component in real time to improve the detection precision; because after the laser beam is split, the transmission line of each laser beam is inconsistent, and the time of arrival to the terahertz wave generator 10, the horizontal terahertz detector 13 and the vertical terahertz detector 14 are different; in order to make the three devices work at the same time to realize the real-time detection of the detected sample 50 and to reduce the measurement error, optical delay lines are respectively provided on the transmission lines of the three laser beams. The delay time of the first delay line 20 can be set longer, followed by the second delay line 21, and the delay time of the third delay line 22 is the shortest.

In one embodiment, the terahertz full-polarization-state detection spectrograph further comprises three sets of lenses and focusing lenses, respectively a first lens 30 and a first focusing lens 40, a second lens 31 and a second focusing lens 41, a third lens 32 and a third focusing lens 42; the terahertz wave generator 10, the horizontal terahertz detector 13, and the vertical terahertz detector 14 are respectively connected between a set of lens and focusing lens, wherein the first lens 30 performs a focusing process on the first light beam and sends the first light beam to the terahertz wave generator 10, the first focusing lens 40 collimates a terahertz wave generated by the terahertz wave generator 10 and sends the terahertz wave to the polarizer 11, and the second lens 31 performs a focusing process on the third light beam and sends the third light beam to the horizontal terahertz detector 13, the second focusing lens 41 performs a focusing process on the horizontal terahertz wave and sends the horizontal terahertz wave to the horizontal terahertz detector 13, the third lens 32 performs a focusing process on the fourth light beam and sends the fourth light beam to the vertical terahertz detector 14, and the third focusing lens 42 performs a focusing process on the vertical terahertz wave and sends the vertical terahertz wave to the vertical terahertz detector 14.

The polarizing beam splitting sheet 12 decomposes the terahertz modulated light to obtain two terahertz waves, with both the polarization direction and the propagation direction being perpendicular to each other, wherein the vertical terahertz wave is sent to the third focusing lens 42 after the propagation direction is changed by the third mirror 25, to be subjected to a focusing process to improve the sensitivity of the terahertz detector, thereby improving the detection precision.

The above terahertz full-polarization-state detection spectrograph, produces a terahertz wave by the terahertz wave generator 10, and optimizes the purity of the terahertz wave by the polarizer 11; a detected sample 50 modulates the terahertz wave, the purity of which is optimized, to obtain a terahertz modulated wave; the terahertz wave is performed a focusing and collimating process by an off-axis parabolic mirror before and after modulation to improve the detection effect; the polarizing beam-splitting sheet 12 decomposes the terahertz modulated wave into a horizontal terahertz wave and a vertical terahertz wave which are vertical to each other in a polarization state; the two corresponding terahertz detectors are used for detecting the two terahertz waves respectively, and then the characteristics of the detected sample are analyzed according to the detection result. Optical delay lines are added to each laser beam to ensure real-time detection of samples. The terahertz full-polarization-state detection spectrograph can quickly detect full-polarization-state terahertz waves accurately, thereby improving the detection precision and detection efficiency of the detected sample.

The technical characteristics of the above-described embodiments may be arbitrarily combined. For the sake of brevity of description, all possible combinations of the technical characteristics in the above embodiments are not described. However, as long as there is no contradiction between the combinations of these technical characteristics, all should be considered as the scope of this Specification.

The above-described embodiments are merely illustrative of several embodiments of the present invention; the description thereof is more specific and detailed, but is not to be construed as limiting the scope of the invention. It shall be noted that those skilled in the art can make a variety of changes and improvements without deviating from the principle of the present invention, and all these should be covered in the protection scope of the present invention. Therefore, the scope of the invention should be determined according to the Claims.

What is claimed is:

1. A terahertz full-polarization-state detection spectrograph, comprising:
    a terahertz wave generator, used for producing a terahertz wave of a linear polarization state using a laser;
    a polarizer located at a radiation end of the terahertz generator, used for receiving the terahertz wave radiation and filtering out the stray light in the terahertz wave to convert the terahertz wave into a linearly polarized light with a higher polarization-state purity, wherein the linearly polarized light outputted by the polarizer is used for illuminating a detected sample to produce a terahertz modulated wave, and the terahertz modulated wave is a full-polarization-state terahertz wave;
    a polarizing beam-splitting sheet located in a transmission path of the terahertz modulated wave, used for decomposing the terahertz modulated wave into a horizontal terahertz wave and a vertical terahertz wave which are vertical to each other in a polarization state, wherein the horizontal terahertz wave is a linearly p-polarized light and the vertical terahertz wave is a linearly s-polarized light;
    a first terahertz detector located in a transmission path of the horizontal terahertz wave, used for detecting the horizontal terahertz wave; and
    a second terahertz detector located in a transmission path of the vertical terahertz wave, used for detecting the vertical terahertz wave, wherein the first terahertz detector and the second terahertz detector respectively use a dipole detecting antenna to receive only a terahertz wave with the polarization state being parallel to the dipole axis.

2. The terahertz full-polarization-state detection spectrograph of claim 1, wherein the polarizer comprises two multi-layer silicon wafers of the same structure, which are inclined in a V-shape, and the angle between each of the multi-layer silicon wafers and the light beam formed by the terahertz wave is a Brewster angle.

3. The terahertz full-polarization-state detection spectrograph of claim 2, wherein the multi-layer silicon wafers have four layers.

4. The terahertz full-polarization-state detection spectrograph of claim 1, wherein the terahertz wave generator is a gallium arsenide photoconductive antenna.

5. The terahertz full-polarization-state detection spectrograph of claim 1, wherein the polarizing beam-splitting sheet is a metal wire grid beam-splitting sheet.

6. The terahertz full-polarization-state detection spectrograph of claim 1, further comprising:

a first off-axis parabolic mirror used for focusing the linearly polarized light produced by the polarizer onto the detected sample; and a second off-axis parabolic mirror used for collimating the terahertz modulated wave and sending it to the polarizing beam-splitting sheet.

7. The terahertz full-polarization-state detection spectrograph of claim 1, further comprising a laser source used for producing a laser.

8. The terahertz full-polarization-state detection spectrograph of claim 7, further comprising a beam-splitting sheet provided on the laser beam path, wherein the beam-splitting sheet comprises:

a first beam-splitting sheet used for splitting the laser into a first light beam and a second light beam, and a second beam-splitting sheet, wherein the first light beam is used for pumping the terahertz wave generator to produce the terahertz wave, and the second light beam is split into a third light beam and a fourth light beam by the second beam-splitting sheet; and the third light beam is used for exciting the first terahertz detector to detect the horizontal terahertz wave, and the fourth light beam is used to excite the second terahertz detector to detect the vertical terahertz wave.

9. The terahertz full-polarization-state detection spectrograph of claim 8, further comprising a first delay line, a second delay line, and a third delay line, wherein the first delay line performs a delaying process on the first light beam and sends the first light beam to the terahertz wave generator, the second delay line performs a delaying process on the third light beam and sends the third light beam to the first terahertz detector, and the third delay line performs a delaying process on the fourth light beam and sends the fourth light beam to the second terahertz detector, so that the lasers processed by the beam-splitting sheet reach the terahertz wave generator, the first terahertz detector and the second terahertz detector at the same time.

10. The terahertz full-polarization-state detection spectrograph of claim 9, further comprising three sets of lenses and focusing lenses, respectively a first lens and a first focusing lens, a second lens and a second focusing lens, a third lens and a third focusing lens, wherein the terahertz wave generator, the first terahertz detector, and the second terahertz detector are respectively connected between a set of lens and focusing lens, wherein the first lens performs a focusing process on the first light beam and sends the first light beam to the terahertz wave generator, the first focusing lens collimates a terahertz wave generated by the terahertz wave generator and sends the terahertz wave to the polarizer, and the second lens performs a focusing process on the third light beam and sends the third light beam to the first terahertz detector, the second focusing lens performs a focusing process on the horizontal terahertz wave and sends the first terahertz wave to the horizontal terahertz detector, the third lens performs a focusing process on the fourth light beam and sends the fourth light beam to the second terahertz detector, and the third focusing lens performs a focusing process on the vertical terahertz wave and sends the vertical terahertz wave to the second terahertz detector.

11. The terahertz full-polarization-state detection spectrograph of claim 1, wherein one of the wave generators is located between a first delay line and a first focusing lens.

12. The terahertz full-polarization-state detection spectrograph of claim 1, wherein one of the wave generators is located between a second delay line and a second focusing lens.

13. The terahertz full-polarization-state detection spectrograph of claim 12, wherein a second one of the wave generators is located between a second delay line and a second focusing lens.

14. The terahertz full-polarization-state detection spectrograph of claim 1, wherein one of the wave generators is located between a first delay line and a second focusing lens.

15. The terahertz full-polarization-state detection spectrograph of claim 1, comprising a third terahertz detector.

16. The terahertz full-polarization-state detection spectrograph of claim 15, wherein the third terahertz detector is located after a third delay line.

* * * * *